United States Patent [19]

Crosby

[11] Patent Number: 4,897,850
[45] Date of Patent: Jan. 30, 1990

[54] ASSEMBLY FOR ARRANGING OPTICAL COMPONENTS OF A LASER

[75] Inventor: Robert A. Crosby, Naperville, Ill.
[73] Assignee: Amoco Corporation, Chicago, Ill.
[21] Appl. No.: 305,385
[22] Filed: Feb. 1, 1989
[51] Int. Cl.[4] .............................................. H01S 3/08
[52] U.S. Cl. ...................................... 372/72; 372/107; 372/109
[58] Field of Search .................... 372/107, 72; 378/92, 378/99, 98

[56] References Cited

U.S. PATENT DOCUMENTS 3,528,030  9/1970  Bickel et al. ........................... 378/72
4,232,276  11/1980  Iwata ...................................... 372/77
4,468,774  8/1984  Robbins ................................. 378/66
4,731,795  3/1988  Clark et al. .......................... 378/107

Primary Examiner—Leon Scott, Jr.
Attorney, Agent, or Firm—Gary J. Cunningham; William H. Magidson; Ralph C. Medhurst

[57] ABSTRACT

This invention relates to an assembly for arranging the optical components of a laser, comprising a plurality of support structures having an indentation defining an inner surface including means for supporting a lens and means for supporting a lasant material, the support structure further including an intermediate surface adjacent to the inner surface, and interlocking means positioned on the intermediate surface for interlocking the plurality of support structures.

20 Claims, 2 Drawing Sheets

U.S. Patent    Jan. 30, 1990    Sheet 1 of 2    4,897,850
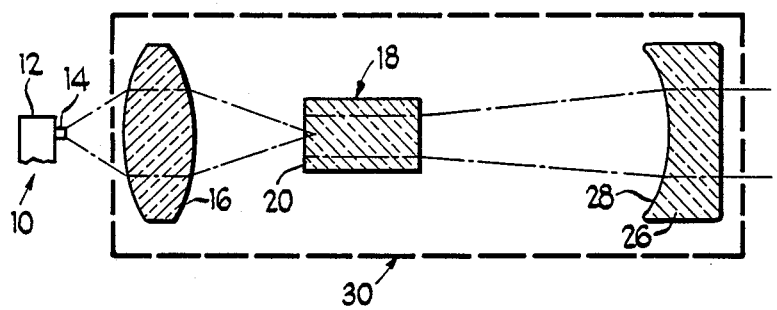
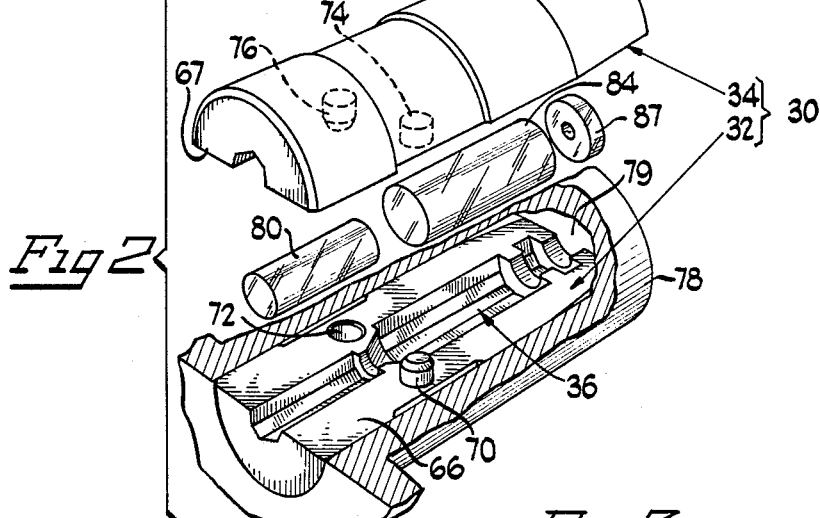
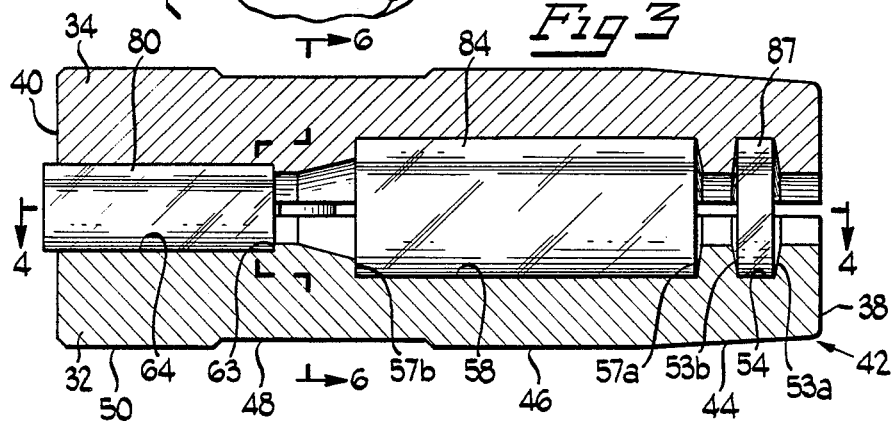
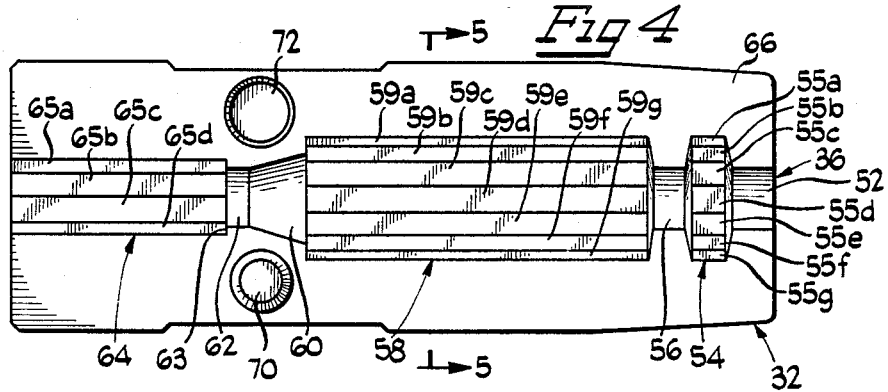

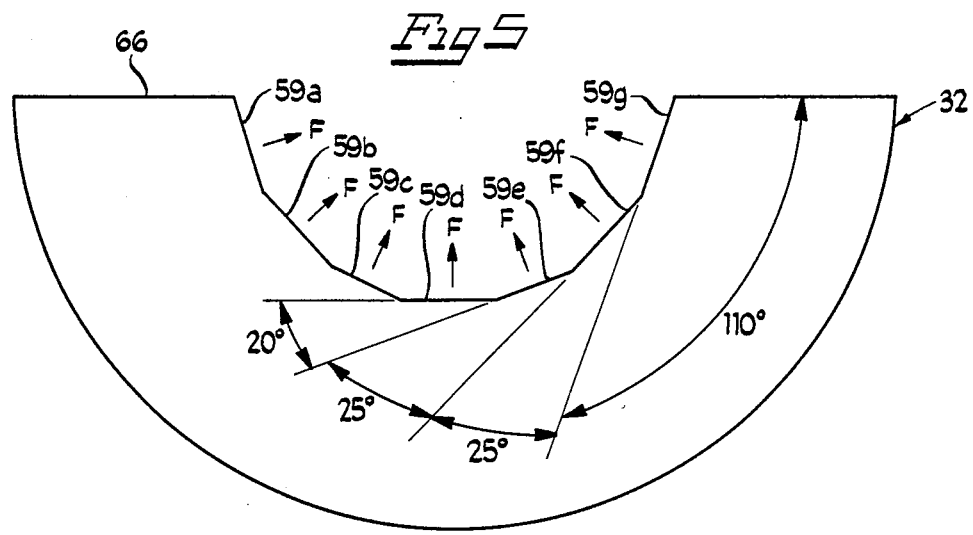
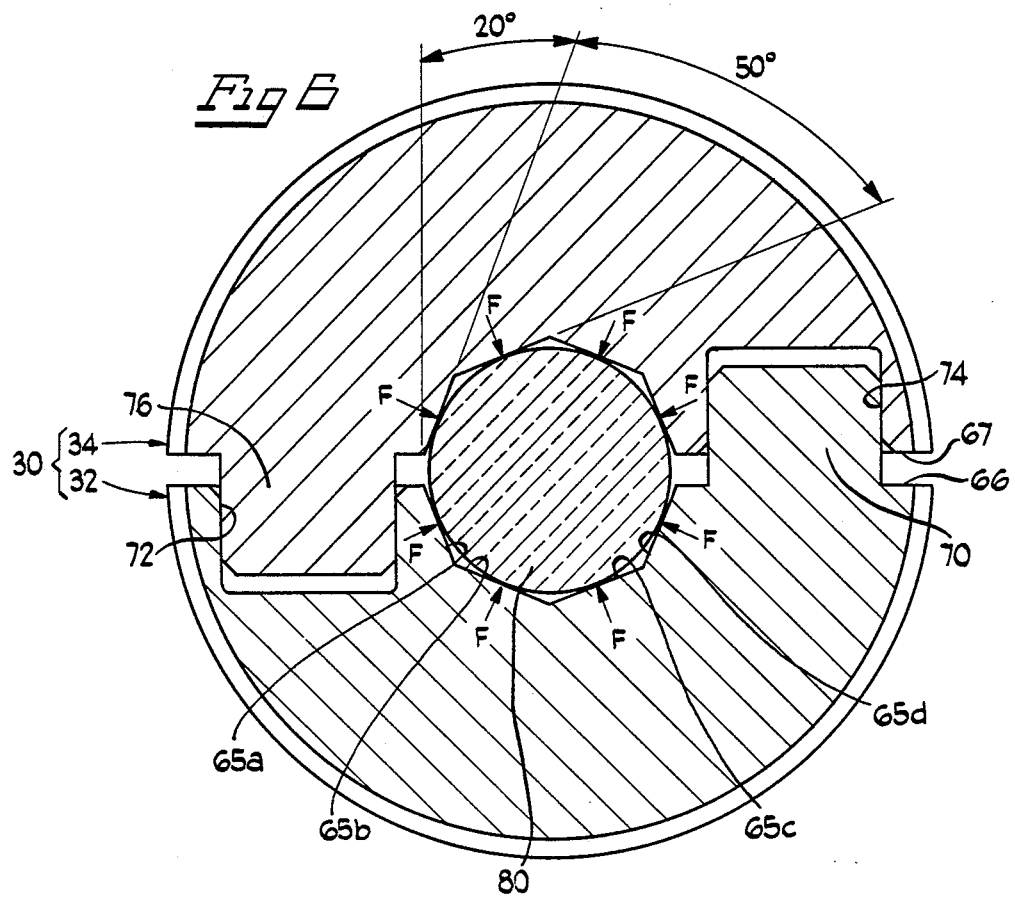

ASSEMBLY FOR ARRANGING OPTICAL COMPONENTS OF A LASER

FIELD OF THE INVENTION

This invention relates to an assembly for arranging optical components of a laser, comprising a plurality of support structures having an indentation defining an inner surface including means for supporting a lens and means for supporting a lasant material, the support structure further including an intermediate surface adjacent to the inner surface, and interlocking means positioned on the intermediate surface for interlocking the plurality of support structures.

BACKGROUND OF THE INVENTION

A laser is a device which has the ability to produce monochromatic, coherent light through the stimulated emission of photons from atoms, molecules or ions of an active medium which have typically been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the energy of photons of substantially identical energy from other excited atoms, molecules or ions. As a consequence, the initial photon creates a cascade of photons between the reflecting surfaces of the optical cavity which are of substantially identical energy and exactly in phase. A portion of this cascade of photons is then discharged out of the optical cavity, for example, by transmission through an output coupler. These discharged photons constitute the laser output.

Excitation of the active medium of a laser can be accomplished by a variety of methods. However, the most common methods are optical pumping, use of an electrical discharge, and passage of an electric current through the p-n junction of a semiconductor laser. Semiconductor lasers contain a p-n junction which forms a diode, and this junction functions as the active medium of the laser. Such devices are also referred to as laser diodes. The efficiency of such lasers in converting electrical power to output radiation is relatively high, and for example, can be in excess of 40 percent.

Small angular misalignments of optical components of a laser can result in substantial losses in laser output power. Accordingly, laser resonators are designed to ensure the maintenance of a stable orientation of these optical components. Ambient temperature fluctuations and temperature fluctuations produced as an undesired by-product of laser operation have also placed constraints on the design of laser resonators. These temperature fluctuations can result in thermally induced distortions of the resonator and associated misalignment of the optical components within the resonator. Accordingly, conventional laser designs have addressed this problem through the use of materials having a low coefficient of thermal expansion, such as Invar, quartz and various ceramics, and also by using external cooling means to thermally stabilize the resonator.

U.S. Pat. Nos. 4,730,335 and 4,731,795 both issued to Clark et al. on Mar. 8, 1988 and Mar. 15, 1988, respectively, are directed to optically pumped solid state lasers which are constructed of components held in association by support structures which are configured to receive the components and automatically arrange them with respect to one another along an optical path.

In the past, aluminum barrels have been commercially used to align and house optical components such as lenses and lasant materials. These barrels require a spacer between the lens and lasant material, and the various optical components must be inserted and adhesively bonded to the inside of the barrel. The drawbacks of such barrels include, for example, a significant likelihood of assembly error (i) by contaminating one of the optical component surfaces by misapplying or improperly spreading the adhesive thereon, or (ii) by damaging, chipping, cracking, scratching, etc., upon insertion into the barrel, one of the optical components, each of which can severely affect the output power or cause total failure of a laser. Accordingly, the components must be inserted carefully into the barrel apparatus, thus requiring manual insertion which is unadaptable to mass production. Another limitation of the barrel apparatus, is that once the lens and lasant material are adhesively bonded to the barrel, if either component has a surface contaminant or defect, the other non-defective component cannot be readily reclaimed. The barrel has to be cut or machined open to reclaim the non-defective component. In such circumstances, it may be more cost effective simply to discard the barrel with the components therein, rather than attempt to reclaim the non-defective component.

SUMMARY OF THE INVENTION

The instant invention is an assembly for arranging optical components of a laser, comprising: (a) a plurality of support structures having an indentation defining an inner surface including means for supporting a lens and means for supporting a lasant material, said support structure further including an intermediate surface adjacent to said inner surface; and (b) interlocking means positioned on said intermediate surface for interlocking said plurality of support structures.

An object of the invention is to provide an assembly for arranging optical components of a laser which aligns and arranges such components with respect to one another along an optical path for optimal power output, despite the nonuniformity of such optical components.

Another object of the invention is to provide an assembly for arranging optical components of a laser which can be easily disassembled, thereby allowing such optical components to be reclaimed.

A further object of the invention is to provide an assembly for arranging optical components of a laser which is portable, lightweight, durable, inexpensive, insensitive to shock, simple in construction, and easy to install, assemble within prescribed tolerances, and maintain.

Another object of the invention is to provide an assembly for arranging optical components of a laser that will maintain the alignment of optical components despite being subjected to severe temperature fluctuations.

A further object of the invention is to provide an assembly for arranging optical components of a laser which can be constructed, at least in part, from materials which have a relatively low coefficient of thermal expansion and a relatively high modulus of elasticity.

A further object of the invention is to provide an assembly for arranging optical components of a laser which is particularly suitable for use in the mass production of lasers.

A further object of the invention is to provide an assembly for arranging the optical components of a laser which can be constructed, at least in part, by the use of injection molding techniques.

BRIEF DESCRIPTION OF THE DRAWINGS

FIG. 1 of the drawings is a schematic view representative of a laser diode-pumped solid state laser.

FIG. 2 of the drawings is an exploded perspective view of an embodiment of this invention.

FIG. 3 of the drawings is a cross-sectional view of the embodiment set forth in FIG. 2.

FIG. 4 of the drawings is a top view of one of the components of the embodiment set forth in FIG. 2.

FIG. 5 of the drawings is a cross sectional view taken along the lines 5—5 of FIG. 4.

FIG. 6 of the drawings is a cross sectional view taken along the lines 6—6 of FIG. 3.

DETAILED DESCRIPTION OF THE PREFERRED EMBODIMENTS

While this invention is susceptible of embodiments in many forms, there are shown in FIGS. 2-6 an embodiment of this invention, with the understanding that the present disclosure is not intended to limit the invention to the embodiment illustrated.

Referring to FIG. 1, a laser diode-pumped solid state laser is illustrated, which includes an optical pumping means 10 consisting of a heat sink 12 and a laser diode 14 attached thereto. Light from laser diode 14 is guided by lens 16 into lasant material 18. Output radiation from the laser is discharged through output coupler 26.

A highly suitable laser diode 14 is a gallium aluminum arsenide laser diode or laser diode array. The output radiation from laser diode 14 should substantially match an appropriate absorption band of lasant material 18.

Heat sink 12 can be passive in character and can also include a thermoelectric cooler to help maintain laser diode 14 at a constant temperature for helping to ensure optimal operation thereof. During operation the laser diode 14 will be attached to a suitable power supply, which is not illustrated in FIG. 1.

Lasant material 18 has a suitable reflective coating on input surface 20 and is capable of being pumped by the light from laser diode 14. The reflective coating on input surface 20 is highly transparent with respect to light produced by the laser diode 14 but is highly reflective with respect to light produced by the lasing of lasant material 18.

The optical cavity of the laser is formed by the reflective coating on surface 20 of the lasant material and a reflective coating on surface 28 of output coupler 26. The coating on surface 28 is selected such that it is sufficiently reflective for light generated by the lasing of lasant material 18 to permit the generation of a resonant field within the optical cavity while transmitting a portion of this light as output radiation from the laser. If desired, the output coupler 26 can be constructed in such a manner that it collimates the laser's output radiation. Output coupler 26 need not be of the precise design illustrated in FIG. 1 and can be of any conventional form.

Pumping radiation from laser diode 14 should substantially match an appropriate absorption band of lasant material 18. This matching can be difficult to achieve because the laser diode 14 is sensitive to temperature, current variations and aging. If desired, the laser diode 14 can be connected to sensitive feedback and thermoelectric heater/cooler circuitry to aid and enhance matching of the absorption peak of the lasant material 18 to the output radiation of laser diode 14.

Lens 16 serves to focus light from laser diode 14 into the lasant material 18. This focusing results in a high pumping intensity and an associated high photon to photon conversion efficiency in lasant material 18. Any conventional optical means for focusing light can be used in place of lens 16. For example, a gradient index lens, a ball lens, an aspheric lens or a combination of lenses can be utilized. A preferred lens 16 is a gradient index lens. The lens 16 can be of any appropriate geometric shape.

Any conventional lasant material 18 can be utilized provided that it is capable of being optically pumped by the laser diode selected. Suitable lasant materials include, for example, neodymium-doped yttrium vanadate ($Nd:YVO_4$); neodymium and/or chromium-doped gadolinium scandium gallium garnet (Nd, Cr:GSGG); thulium, holmium and/or erbium-doped yttrium aluminum garnet (Tm, Ho, Er:YAG); and glassy and crystalline host materials which are doped with an active material. Highly suitable active materials include, ions of chromium, titanium and the rare earth metals. Neodymium-doped YAG is a highly suitable lasant material 18 for use in combination with laser diode 14 which produces light having a wavelength of about 808 nm. When pumped with light of this wavelength, the neody- mium-doped YAG or lasant material 18 can emit light having a wavelength of 1,064 nm.

For a neodymium-doped YAG rod 18 which is pumped with light having a wavelength of 808 nm, the coating on input surface 20 should be substantially transparent to 808 nm light and highly reflective with respect to light having a wavelength of 1,064 nm. The wavelength selective mirror which is created by the coating on input surface 20 need not be located on the input surface 20 of lasant material 18. If desired, this mirror can be located anywhere between laser diode 14 and the lasant material 18 and can consist of a coating deposited on any suitable substrate. In addition, the mirror can be of any suitable shape.

All of the optical elements illustrated within the dashed line of FIG. 1, can be held by the assembly for arranging optical components of a laser 30, as hereafter illustrated.

Referring to FIG. 2, there is schematically shown an assembly for arranging optical components of a laser 30. The assembly 30 includes a first and second elongated support structure 32 and 34, respectively. The assembly is substantially tubular in shape when structures 32 and 34 are interconnected. The support structure 32 is generally trough or tray shaped, which includes an indentation or groove being centrally located and extending longitudinally along support structure 32 defining an inner surface 36. The inner surface 36 is configured: (i) to at least partially receive various laser components, such as a lens, a lasant material and optionally, an aperture; (ii) to automatically arrange these components along the optical path defined by the inner surface 36; and (iii) to arrange these components with respect to each other and with respect to an optical pumping means 10.

As illustrated by FIG. 2, the first and second support structures 32 and 34 are identical or mirror images of each other except for the interlocking means, which will be discussed hereafter. Accordingly, only the first support structure 32 will be discussed.

The support structure 32 can be composed of any suitable material, such as metals, ceramics, glass, cast epoxies, thermoplastic materials and thermosetting materials. In addition, the support structure 32 can be fabricated by any conventional technique. A highly preferred embodiment of the invention involves the use of a support structure 32 which is comprised of one or more thermoplastic or thermoset materials. If desired, composites of such materials with various fibers or other strengthening agents can be employed. Thermoplastic and glass support structures 32 can be conveniently fabricated by various injection molding techniques.

As illustrated in FIG. 3, the elongated support structures 32 and 34 include an insert end 38 and a lens end 40. The insert end 38 has a smaller diameter than the lens end 40, for easy insertion of assembly 30, into an elongated and tubular housing 78, having a bore 79, (see FIG. 2). The housing 78 is utilized to securely connect and arrange the assembly 30 and optical components therein with respect to an optical pumping means 10.

Referring to FIG. 3, support structures 32 and 34 further include an outer surface 42, which comprises an inclined area 44, a middle area 46, a recessed area 48, and a lens area 50. The inclined area 44 also contributes to easing and simplifying the insertion of the assembly 30, which includes the first and second elongated support structures 32 and 34, into bore 79 of housing 78 in FIG. 2. The assembly 30 fits snugly in the bore 79 of housing 78, thereby exerting a radial and uniform compression force on assembly 30 which holds the interconnected support structures 32 and 34, along with the optical components therein, while also being maintained in axial alignment with the optical pumping means 10. The middle area 46 and lens area 50 of outer surface 42, contact the surface of the bore 79 for a tight and snug fit. A set screw (not shown in the drawings) perpendicular to and through housing 78 can be utilized to keep the assembly 30 snugly within bore 79. The assembly 30 sandwiches or squeezes the optical components, such as a lens 80, a lasant material 84 and/or an aperture 87 between support structures 32 and 34. Further, the middle area 46 and lens area 50 of outer surface 42 comprise a smooth surface which allows assembly 30 to be adjusted in a direction closer to or farther from the optical pumping means 10, for optimal power output.

Referring to FIG. 4, the inner surface 36 of support structure 32 includes an insert area 52, an aperture supporting means 54, spacer 56, lasant material supporting means 58, inclined area 60, spacer 62, and lens supporting means 64.

As illustrated in FIG. 3, the aperture supporting means 54 includes sidewalls 53a and 53b. In FIG. 4, the aperture supporting means 54 can be of any geometric shape which is adapted to receive an aperture, preferably semicircular, and more preferably, comprising a plurality of longitudinally extending flat sections 55a, 55b, 55c, 55d, 55e, 55f, and 55g. Analagous to the structure illustrated in FIG. 5, in a preferred embodiment, flat sections 55a and 55g are inclined in a direction downwardly and inwardly at an angle of about 110° from the intermediate surface 66, flat sections 55b and 55f are inclined in a direction downwardly and inwardly at an angle of about 135° from the intermediate surface 66, flat sections 55c and 55e are inclined downwardly and inwardly at an angle of about 160° from the intermediate surface 66, and flat section 55d is parallel to intermediate surface 66. The assembly 30 is configured so that when it is inserted in the bore 79 of housing 78, compression forces are exerted radially in an inwardly direction to squeeze or sandwich the optical components between the first and second support structures 32 and 34. The compression forces are generally perpendicular to the flat sections 55a–g, and substantially uniform throughout the first and second support structures 32 and 34. Also in a preferred embodiment, the sidewalls 53a and 53b are slightly inclined in a direction downwardly and inwardly for simplified insertion of aperture 87 at least partially in aperture supporting means 54, as illustrated in FIG. 3.

In FIG. 3, the lasant material supporting means 58 includes sidewalls 57a and 57b. Referring to FIG. 4, the lasant material supporting means 58 can be of any geometric shape which is adapted to receive a lasant material, preferably elongated and semicircular, and more preferably comprising a plurality of longitudinally extending flat sections 59a, 59b, 59c, 59d, 59e, 59f and 59g. As illustrated in FIG. 5, in a preferred embodiment, flat sections 59a and 59g are inclined in a direction downwardly and inwardly at an angle of about 110° from the intermediate surface 66, flat sections 59b and 59f are inclined at an angle of about 135° from the intermediate surface 66, flat sections 59c and 59e are inclined at an angle of about 160° from the intermediate surface 66, and flat section 59d is parallel to intermediate surface 66. The compression forces, designated as F, are exerted radially in an inwardly direction to squeeze or sandwich lasant material 84 between the first and second support structures 32 and 34. The compression forces F are generally perpendicular to the flat sections 59a–59g, and substantially uniform throughout support structure 32, as illustrated in FIG. 5, as well as in support structure 34 when assembled in the bore 79 of housing 78. Also in a preferred embodiment, sidewall 57a is slightly inclined in a direction downwardly and to the left, as illustrated in FIG. 3, for easy insertion of lasant material 84 at least partially in lasant material supporting means 58. The sidewall 57b touches only the outermost portion of the input surface of lasant material 84, to minimize the possibility of scratching or damaging such surface. Lasant materials such as Nd:YAG rods, which are commercially available, generally do not have uniform dimensions. Thus, for optimal power output when the lasant material 84 is a shorter than normal Nd:YAG rod, such rod is positioned in the lasant material supporting means 58 to touch sidewall 57b, for optimal power output.

The lens supporting means 64 in FIG. 3 includes sidewall 63. The lens supporting means 64 can be of any geometric shape which is adapted to receive a lens, preferably elongated and semicircular, and more preferably comprising a plurality of longitudinally extending flat sections 65a, 65b, 65c and 65d, as illustrated in FIGS. 4 and 6. In a preferred embodiment, flat section 65a and 65d are inclined in a downwardly and inwardly direction, at an angle of about 110° from the intermediate surface 66, and flat sections 65b and 65c are inclined at an angle of about 160° from the intermediate surface 66. The compression forces F illustrated in FIG. 6, are exerted radially in an inwardly direction to squeeze or sandwich lens 80 between first and second support structures 32 and 34. The compression forces F are generally perpendicular to the flat sections 65a–d, and uniform throughout support structures 32 and 34, when assembly 30 is inserted in the bore 79 of housing 78. The lens 80 fits in lens supporting means 64 and abuts sidewall 63.

Up to this point, the configurations of the first and second support structures 32 and 34 have been identical. Thus all of the structure previously discussed with respect to the first support structure 32 is also embodied in the second support structure 34. The structure disclosed in the following paragraph is where the first and second support structures 32 and 34 differ.

Referring to FIGS. 2 and 6, the first and second elongated support structures 32 and 34 include intermediate surfaces 66 and 67, respectively, and each has interlocking means. The interlocking means can include any configuration which interlocks, interconnects, aligns, positions or attaches the support structures 32 and 34 together. In a preferred embodiment, the interlocking means of the first elongated support structure 32 includes a male and a female member 70 and 72, respectively, which interlock and interconnect with the female and male members 74 and 76, respectively, which comprise the interlocking means of the second elongated support structure 34. Alternative examples of interlocking means can include, but are not limited to, conventional snap, twist or snap-twist type arrangements, complimentary-configured arrangements, modified male-female arrangements, or combinations thereof. If desired, adhesives, bonding agents, screws, bolts, posts, etc. can be used in combination with said interlocking means.

In a preferred embodiment shown in FIG. 6, the intermediate surfaces 66 and 67 of first and second support structures 32 and 34, respectively, do not contact or touch each other. The assembly 30 provides a firm compression, sandwiching or squeezing force, which holds the optical components securely in alignment with respect to each other, and securely fits in the bore 79 of housing 78 to arrange the optical components with respect to an optical pumping means 10 for optimal output power. The compression forces F, illustrated in FIGS. 5 and 6, are radial, substantially uniform throughout and directed in an inwardly direction.

The assembly 30 in FIG. 2 is adapted to receive a lens 80, a lasant material 84 and optionally an aperture 87, each of which sits on, abuts, is partially received in and is substantially adjacent to the lens supporting means 64, the lasant material supporting means 58, and the aperture supporting means 54, respectively. The lens 80 in FIG. 3 can extend outwardly beyond lens supporting means 64 and lens end 40. Such configuration is particularly useful for providing a simple adjustment of the lens 80 at least partially in assembly 30 in a direction closer to or farther from an optical pumping means 10, for maximizing power output.

The aperture 87 comprises a disk having a hole or opening in the center. The assembly 30 is configured to ensure the maintenance of a stable orientation of the lens 80, the lasant material 84, and the aperture 87, with respect to one another along an optical path defined by inner surface 36, and with respect to an optical pumping means 10. Further, the assembly 30 provides a means for adjusting the optical components contained within the assembly 30 in a direction toward or away from an optical pumping means for maximum power output. Moreover, the assembly 30 provides for the reclaiming of optical components and simplified access to and replacement of defective components.

The assembly 30 is configured and adapted to being used in an assembly line operation, and particularly adapted to utilizing robotics for the mass production and assembly of lasers. More particularly, the assembly 30 can be assembled in the following manner. First, the injection molded support structures 32 and/or 34 are placed in a predetermined position on an assembly line. Second, the optical components are dropped or inserted in place, noting that such components are automatically arranged within prescribed tolerances with respect to one another. In particular, the inclined sidewalls 53a and 53b allow aperture 87 to be steered into aperture supporting means 54 and sidewall 57a allows lasant material 84 to be steered into the lasant material supporting means 58. For optimal power output, the lasant material must touch and abut sidewall 57b, thereby assuring that the lens 80 and lasant material 84 are at a preselected distance from each other. Lens 80 is placed in lens supporting means 64 extending outwardly from lens end 40 and against sidewall 63. Next, the first and second support structures 32 and 34 are interconnected with the interlocking means by inserting 76 into 72 and by inserting 70 into 74. Subsequently, the assembly 30 with the optical components therein is inserted into the bore 79 of a housing 78. The smaller diameter of insert end 38 and the inclined area 44 of the outer surface 42 contribute to the simplified insertion of assembly 30 into bore 79. Once assembled, the assembly 30 can be readily adjusted for optimal performance by varying and/or measuring the distance of lens 80 from the optical pumping means 10. The smooth surfaces of middle area 46 and lens area 50 of the outer surface 42 contribute to simplifying such adjustment, while providing a snug fit in the bore 79 of housing 78.

Although only one embodiment of this invention has been shown and described, it is to be understood that various modifications and substitutions as well as rearrangements and combinations of the preceding embodiment can be made by those skilled in the art without departing from the novel spirit and scope of this invention.

We claim:

1. An assembly for arranging optical components of a laser, comprising:
  (a) a plurality of support structures including at least a first and a second support structure each having an intermediate surface with indentations defining inner surfaces for supporting optical components to include at least a leans and a lasant material, said said inner surfaces of said intermediate surface exert radially compressive forces in an inward direction on said optical components to include said lens and said lasant material, said compressive forces being substantially uniform throughout said inner surfaces such that said optical components to include said lens and said lasant material are securely optical alignment with each other, said first support structure intermediate surface being substantially not in contact with said second support structure intermediate surface; and
  (b) interlocking means positioned on each of said intermediate surfaces for interlocking said first and second support structures, said first support structure interlocking means being attached to said second support structure interlocking means.

2. The assembly in accordance with claim 1, wherein each of said support structures is generally elongated and said indentation defining said inner surface extends generally longitudinally on said support structure.

3. The assembly in accordance with claim 2, wherein said indentation is substantially centrally located on said support structure.

4. The assembly in accordance with claim 1, wherein said plurality of said support structures includes a first support structure and a second support structure interlocked to said first support structure by said interlocking means.

5. The assembly in accordance with claim 4, wherein said interlocked support structures are substantially tubular in shape.

6. The assembly in accordance with claim 4, wherein said support structures are maintained in said interlocked relationship by compression means.

7. The assembly in accordance with claim 1, wherein said support structure is comprised of least one material selected from the group consisting of metals, ceramics, epoxies, glass, thermoplastic materials and thermosetting materials.

8. The assembly for arranging the optical components of a laser in accordance with claim 1, wherein said interlocking means includes at least one male member extending outwardly from said intermediate surface of said support structure.

9. The assembly in accordance with claim 8, wherein said interlocking means includes at least one female member for receiving said male member.

10. The assembly in accordance with claim 1, wherein said lasant material support means comprises a portion of said inner surface which is adapted to receive a lasant material and includes a plurality of longitudinally extending flat sections.

11. The assembly in accordance with claim 1, wherein said lens supporting means comprises a portion of said inner surface which is adapted to receive a lens and includes a plurality of longitudinally extending flat sections.

12. The assembly in accordance with claim 1, further comprising means for supporting an aperture on said inner surface of said support structure.

13. An apparatus comprising:
(a) a plurality of support structures including at least a first and a second support structure each having indentations defining inner surfaces including means for supporting a lens and means for supporting a lasant material, said support structures further including an intermediate surface adjacent to said inner surfaces, said first support structure intermediate surface substantially not in contact with said second support structure intermediate surface;
(b) a lasant material which is received at least partially in said lasant material supporting means;
(c) a lens for focusing optical pumping radiation into said lasant material, said lens being received at least partially in said lens supporting means; and
(d) interlocking means positioned on each of said intermediate surfaces for interlocking said first and second support structures, said first support structure interlocking means being attached to said second support structure interlocking means.

14. The apparatus in accordance with claim 13, further comprising means for supporting an aperture on said inner surface of said support structure, said aperture being received at least partially in said aperture supporting means.

15. The apparatus in accordance with claim 14, wherein said aperture is sandwiched at least partially between said aperture supporting means of said first support structure and said second support structure.

16. The apparatus in accordance with claim 13, wherein said lens is a gradient index lens.

17. The apparatus in accordance with claim 13, wherein said lasant material comprises neodymium-doped yttrium aluminum garnet.

18. The apparatus in accordance with claim 13, wherein said plurality of said support structures includes a first support structure and a second support structure interlocked to said first support structure, and wherein said lens is sandwiched at least partially between said lens supporting means of said first support structure and said second support structure, and wherein said lasant material is sandwiched at least partially between said lasant material supporting means of said first support structure and said second support structure.

19. The apparatus in accordance with claim 18, wherein said first and second support structures contact each other at said interlocking means.

20. The apparatus in accordance with claim 13, wherein said plurality of support structures are held in an interlocked relationship by means of compression means.

* * * * *